3,162,572
HEXACHLOROPHENE COMPOSITION AND METHOD FOR RENDERING NATURAL BRISTLE BACTERIOSTATIC
Charles Lee Granquist, North Amherst, Mass., and John C. Lazanas, Chicago, Ill., assignors, by mesne assignments, to The Standard Oil Company, Cleveland, Ohio, a corporation of Ohio
No Drawing. Filed Nov. 27, 1961, Ser. No. 155,202
5 Claims. (Cl. 167—38.7)

This invention relates to the provision of bristle material which possesses bacteriostatic properties for use in the production of personal use brushes, and in the production of brushes and similar implements for hospital and other uses, where such properties are necessary or desirable. More particularly it relates to natural bristle material such as hog or other animal bristles, and animal hair such as horse and camel hair, and to methods and materials for rendering such natural bristle bacteriostatic, and the term "natural bristle" is, therefore, here used, and is to be construed to include, all such natural materials.

Hexachlorophene [bis(2 - hydroxy-3,5,6-trichlorophenyl)methane] has recognized bacteriostatic properties and has found acceptable use as such in various materials for personal use, such as soaps.

The principal objects of the invention are to provide natural bristles containing hexachlorophene in quantities to render the bristles bacteriostatic over a substantial period of use and to provide ways and means for incorporating the needed quantity of hexachlorophene into the bristle structure.

The various natural bristle materials commonly employed in the manufacture of personal-use brushes have relatively high water absorptive properties. Hexachlorophene is substantially insoluble in water, a property which would provide the advantage of long retention in personal-use brushes, such as toothbrushes, shaving brushes, bath brushes and the like which are used in a moistened condition or in contact with moisture, as well as brushes of various utility in hospitals and other places where antiseptic conditions are important. This insolubility of hexachlorophene, however, prevents its introduction in adequate quantities into the natural bristle structure, by known procedures.

We have found the above objectives can be attained by the use of a novel solvent system for the hexachlorophene comprising water, borax, diethanolamine, and diethylene glycol monoethyl ether to provide a hexachlorophene concentrate. When this concentrate is diluted with up to 60 parts of water a saturated solution of hexachlorophene results and when natural bristle material is immersed therein for periods up to 4 hours and then dried, natural bristle material containing up to .05% hexachlorophene is obtained.

The following proportionate concentrate formula has been found generally preferable:

Borax _____gr__ 150
Water _____ml__ 150
Diethanolamine _____ml__ 150
Diethylene glycol monoethyl ether _____ml__ 200
Hexachlorophene _____gr__ 150

The borax has been found to be an effective agent in facilitating and promoting the penetration of the water diluted concentrate into the bristle structure. It has been found, however, that when the borax is present in quantity effective for the purpose, it tends to rather rapidly thicken or harden the concentrate, if the latter is not immediately diluted for use. Immediate dilution is undesirable if not impossible in the generality of brush manufacturing procedures and practice.

We have found that this difficulty can be overcome and a stable concentrate prepared if only a minimal amount, preferably about 5 grams, of borax is present in the concentrate, the balance of the borax requirement being added when the 1–60 dilution of the concentrate is effected. The dilute formulation remains stable.

When for the reason above pointed out immediate dilution of the concentrate is not feasible, the preferred formula of the hexachlorophene concentrate is in the following proportions:

Borax _____gr__ 5
Water _____ml__ 150
Diethanolamine _____ml__ 150
Diethylene glycol monoethyl ether _____ml__ 200
Hexachlorophene _____gr__ 150

To this stable concentrate is added 145 gr. of borax either just prior to or with the addition of sufficient water to effect a 1–60 dilution of the concentrate and added borax, to provide the formulation in which the bristle material is soaked.

The above stable concentrate is best prepared in the following manner: 5 grams of borax is completely dissolved in 150 millilitres of water; 150 millilitres of diethanolamine is added to the borax solution and, after mixing, 200 millilitres of diethylene glycol monoethyl ether is added. After thoroughly mixing such solution, 150 grams of hexachlorophene is introduced, a few grams at a time with continuous agitation taking place after each small addition of hexachlorophene. When the final addition of 145 grams of borax is added, prior to dilution for use, the mixture is agitated vigorously in a shaking device for at least 12 hours (or overnight) until a homogeneous mixture is formed containing no clump of material.

Upon the addition of 145 grams of borax, to complete the borax requirements, and sufficient water to effect the 1–60 dilution, a small amount of hexachlorophene may precipitate indicating that the hexachlorophene is present in the bath in saturating quantity.

It will be understood that any suitable mechanical mixing devices such as shakers, stirring motors and blenders may be used in preparing the concentrate, and in making the final addition of borax and sufficient water to effect the 1–60 solution.

The time during which the bristle is immersed will vary with the character and kind of natural bristle being treated.

In laboratory tests soaking natural bristle toothbrushes for ten minutes at 140° F. then drying immediately at 158° F. and once repeating that procedure gave a maximum uptake of hexachlorophene.

In commercial practice immersion in the diluted dispersion for from 2 to 4 hours at a temperature of about 140° F. is generally preferable for all hog bristle. The bristles are dried, without rinsing at a temperature of from 100° F. to 180° F., preferably about 140° F. The above immersion procedure may advantageously be repeated using the same times and temperatures, with the exception that following the first immersion the drying may be limited to the removal of approximately 75% of the moisture.

The so-treated hog bristle embodied in a toothbrush was found to contain approximately .05% hexachlorophene.

By the procedures above set forth hexachlorophene is successfully incorporated in natural bristle at a concentration of at least .05% and in a manner to retain an adequate degree of effectiveness over an extended period of toothbrush use. Natural bristle treated in accordance with the invention retain their bacteriostatic effectiveness when incorporated in other types of personal-use, hospital and other brushes for uses where bacteriostatic properties are desired.

What is claimed is:

1. The method of rendering natural bristle material bacteriostatic which comprises immersing the natural bristle material for a period of 2 to 4 hours in an aqueous solution made up of one part of a hexachlorophene concentrate comprising 5 to 150 grams of borax, 150 millilitres of water, 150 millilitres of diethanolamine, 200 millilitres of diethylene glycol monoethyl ether and 150 grams of hexachlorophene, said concentrate being diluted with substantially 60 parts water with the addition of sufficient borax to bring the total borax content of the solution to 150 grams for each part of the concentrate used, and thereafter drying the bristle material.

2. The method as recited in claim 1 in which the one part of hexachlorophene concentrate contains 5 grams of borax, and the amount of borax added with the 60 parts of water is 145 grams.

3. A hexachlorophene concentrate for use in rendering natural bristle material bacteriostatic which comprises 5 to 150 grams of borax, 150 millilitres of water, 150 millilitres of diethanolamine, 200 millilitres of diethylene glycol monoethyl ether and 150 grams of hexachlorophene.

4. A hexachlorophene concentrate for use in rendering natural bristle material bacteriostatic which comprises substantially 5 grams of borax, 150 millilitres of water, 150 millilitres of diethanolamine, 200 millilitres of diethylene glycol monoethyl ether and 150 grams of hexachlorophene.

5. The method of forming a saturated solution of hexachlorophene which comprises dissolving, proportionately, 5 to 150 grams of borax in 150 millilitres of water, successively mixing into said solution 150 millilitres of diethanolamine, 200 millilitres of diethylene glycol monoethyl ether, 150 grams of hexachlorophene, sufficient borax to bring the total borax in the mixture to 150 grams and diluting said mixture with 60 parts of water.

References Cited in the file of this patent

UNITED STATES PATENTS

| | | |
|---|---|---|
| Re. 21,197 | Hill et al. | Sept. 5, 1939 |
| 1,919,298 | Lehmann et al. | July 25, 1933 |
| 2,216,333 | White et al. | Oct. 1, 1940 |
| 2,250,480 | Gump | July 29, 1941 |
| 2,268,387 | Flenner et al. | Dec. 30, 1941 |
| 2,720,480 | Wolf | Oct. 11, 1955 |
| 2,900,306 | Slater | Aug. 18, 1959 |
| 2,933,433 | Teller et al. | Apr. 19, 1960 |

OTHER REFERENCES

J.A.P.A. (Scientific Edition), August 1951, vol. 40, No. 8, pp. 390–393.